Figure 1:
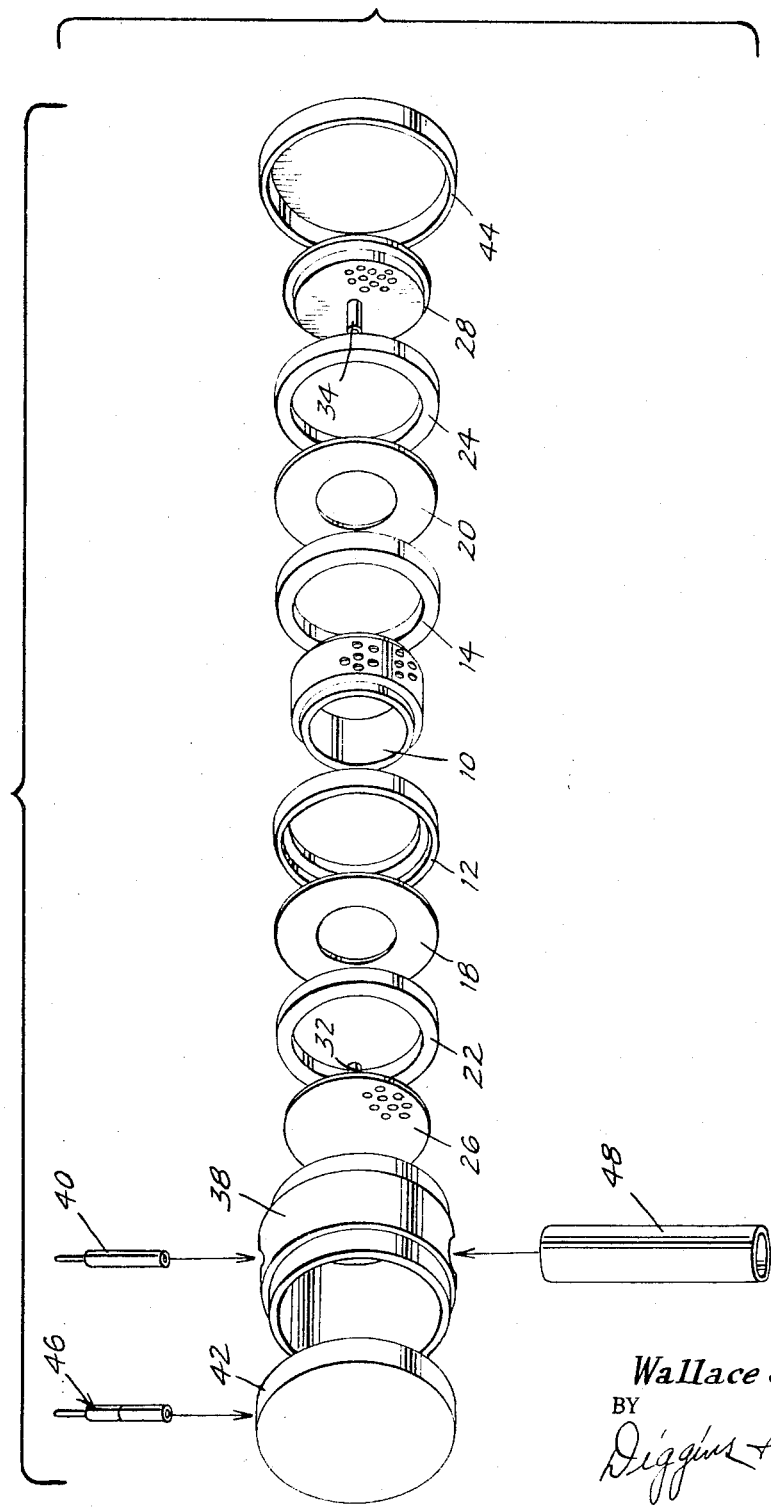

Aug. 16, 1966  W. S. KREISMAN  3,267,313
COLD CATHODE MAGNETRON TYPE IONIZATION GAUGE
Filed Nov. 3, 1961  2 Sheets-Sheet 1

INVENTOR.
Wallace S. Kreisman
BY
Diggins + Le Blanc
ATTORNEYS

INVENTOR.
Wallace S. Kreisman

United States Patent Office 3,267,313
Patented August 16, 1966

3,267,313
COLD CATHODE MAGNETRON TYPE
IONIZATION GAUGE
Wallace S. Kreisman, Malden, Mass., assignor to GCA Corporation, Bedford, Mass., a corporation of Delaware
Filed Nov. 3, 1961, Ser. No. 149,906
14 Claims. (Cl. 313—7)

This invention relates to a vacuum gauge for measuring low pressures and more particularly to a cold cathode ionization pressure gauge which reads ion current from about $1 \times 10^{-4}$ millimeters of mercury to the lowest measurable pressure. The invention described herein was made in the performance of work under a NASA contract and is subject to the provisions of Section 305 of the National Aeronautics and Space Act of 1958, Public Law 85-568 (72 stat. 435; 42 U.S.C. 2457).

The usual or conventional ionization vacuum gauge is generally constructed to resemble, to some extent, the well known triode vacuum tube. These vacuum gauges consist of a filamentary cathode, an accelerating grid, and a plate electrode which is usually circular in configuration. The electrons which are emitted from the filament move at a high velocity toward and through the grid structure. During this travel, the electrons will collide with any gas molecules that may be present within the tube envelope. These collisions between the electrons and gas molecules will produce ions. The number of ions produced by these collisions per unit time is assumed to be proportional to the density of the gas, all other factors remaining constant, and hence proportional to the pressure. A current, which is obtained by collecting the ions upon a negatively charged electrode, is measured, thereby giving an indication of the degree of vacuum present within the tube envelope. This current flow through the measuring circuit, however, is only an approximate indication of the ions present. Actually, it is the ratio of ion current measured to the electron current furnished to the grid of such devices that may correctly be said to represent the pressure. Owing to this, and other fundamental limitations, the gauge current indicated by this type of device is not proportional to the pressure (valid) for pressures below about $10^{-8}$ mm. of mercury.

Various attempts have been made in the past to improve this conventional type vacuum gauge without any marked degree of success. Due to this inability to improve the low pressure range of the conventional vacuum gauge, the range of pressure extending below about $10^{-8}$ to $10^{-11}$ mm. of mercury are presently measured by a special type of ionization gauge known as a Bayard-Alpert gauge. This type of gauge employs a heated filament externally of a positive acceleration grid, and both ion current to a central anode wire and the electron current to the accelerating grid are measured to establish the pressure within the gauge.

The Bayard-Alpert type gauge was found to still contain certain errors in current reading which are due primarily to X-ray defects. The ionizing electrons of the gauge produced X-rays on collision with the metal anode, grids, or other tube structures. These X-rays in turn cause photoelectric emission of electrons from the positive ion collector and from the envelope walls. Photoelectric current due to such excitation by X-rays is indistinguishable from the net ion current at the positive ion collector.

To overcome the X-ray emission problem of the Bayard-Alpert type gauge, a third type of vacuum gauge has been proposed. This third type of gauge relied upon cold emission of electrons, spirally lengthened electron paths, and isolation of the positive ion collector from other electrons for its improved operating characteristics.

Current designs of the above type cold cathode ionization gauge use a plurality of metal electrodes which are located within a glass housing or envelope. Passing through the glass envelope are a plurality of fairly long metal leads. These leads serve not only to connect the electrodes to an outer electrical circuit but also to support the electrodes within the envelope. This construction results in a poor electrode alignment and makes the gauge greatly susceptible to damage or destruction from shock and vibration. The use of a glass envelope is also highly undesirable for a low pressure gauge. The glass envelope is not only fragile but the bake-out temperature that can be used is limited to approximately 450° C. Pyrex glass should not be used as a housing material for a low pressure gauge since Pyrex glass has a high helium permeation rate that limits the lowest pressure that can be reached. Another disadvantage is that the overall size of the completed gauge, constructed in accordance with the above, is such as to make it impractical to shield the tube envelope over its entire surface.

According to the present invention, it has been found that these difficulties may be overcome by providing a metal-ceramic ionization type gauge which is mechanically much stronger than the glass-metal tube and can withstand greater thermal shock. The tube can be out-gassed at high temperatures and the metal-ceramic envelope will not allow gasses such as helium to pass through the envelope. Complete shielding of the gauge is also possible by shielding the connections to the anode and cathode electrodes. The new gauge design also allows the electrodes and other gauge structures to be manufactured or positioned to a very close tolerance. This accuracy insures the reproducibility of the electrical field distribution from one ion gauge to another.

Accordingly, it is a primary object of this invention to provide an ion type gauge having improved construction, vacuum, and electrical characteristics over known ion gauges.

Another object of this invention is to provide an ionization gauge which may be out-gassed at high temperatures.

Yet another object of this invention is to provide an ionization gauge having an envelope which will reduce gas permeation.

Still another object of this invention is to provide an ionization gauge which may be completely shielded.

A still further object of this invention is to provide an ionization gauge that can be conventionally scaled up or down in size and can be easily mass produced.

Yet still another object of this invention is to provide an ionization gauge that can be demountable if desired.

Figure 2:
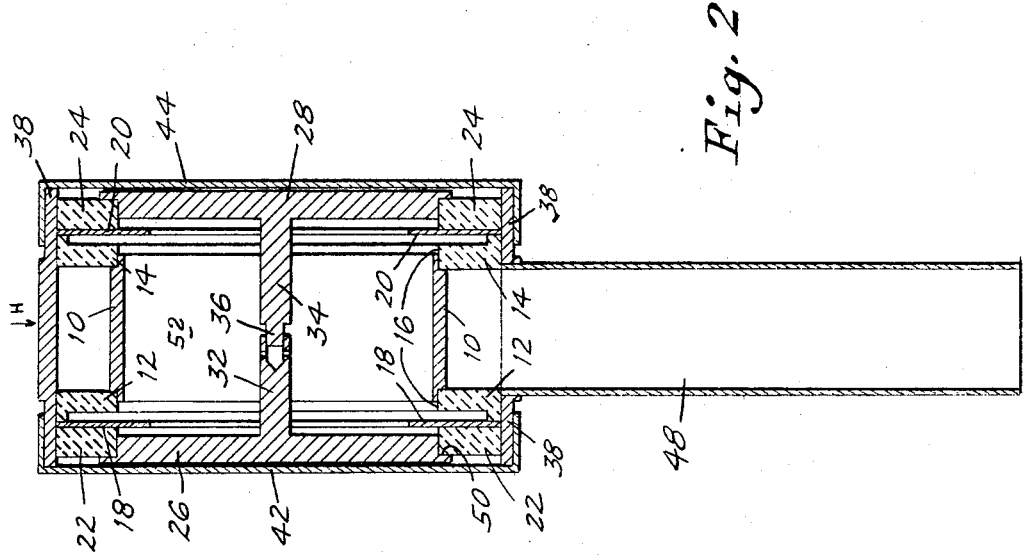

These and further objects and advantages of the invention will become more apparent upon reference to the following description and claims and the appended drawings wherein:

FIGURE 1 is an exploded view of an ionization gauge constructed in accordance with the present invention; and FIGURE 2 is a sectional view of the assembled ionization gauge.

The same reference numerals denote the same part throughout the several views of the drawings.

In reference to FIGURE 1, an exploded view of the ionization gauge and a somewhat detailed showing of the various elements used in constructing the gauge is shown. The gauge consists of a central electrode or high voltage anode 10 which is adapted to be sandwiched between two inner ceramic rings 12 and 14. The anode 10 has a machined portion 16 which is adapted to hold the ceramic rings in place and position the anode structure (FIGURE 2). Two thin metal cathode shield electrodes 18 and 20 are then sandwiched between the inner ceramic rings 12–14 and two outer ceramic rings 22 and 24, respectively. The cathode or ion collector electrode is made up of two pieces 26 and 28 that fit together at the very center of the tube (or at one end, in another design) to form a spool shaped electrode.

The two halves of the cathode have extended portions 32 and 34 which form a socket joint 36 (FIGURE 2) when the halves are pressed together. After the various elements of the electrode subassembly 30 are sandwiched into their proper position, the cathode halves 26 and 28 are pressed together. The overlapping portion 36 formed by the two halves is then brazed or welded, thus permanently securing the subassembly together.

The subassembly, once secured together, is then inserted into a metal envelope housing unit 38. The thin metal cathode shield electrodes 18 and 20 are then brazed or welded to the metal envelope by appropriate means. With the shield electrodes brazed or welded to the envelope, a metal-ceramic feedthrough 40 is brazed to the envelope 38. The lead-in portion of the feedthrough 40 is then connected to the anode 10 by suitable means.

Once the appropriate connections have been made, the envelope 38 is sealed by placing circular metal end caps 42 and 44 over the reduced diameter end portions of the envelope 38. These caps are then brazed to the envelope to assure a perfect airtight seal.

A second metal-ceramic feedthrough 46 is connected to the cap 42 by brazing and is electrically connected to the cathode by suitable means. Also brazed to the envelope 38 is tubular pumping connection 48 which permits the gauge to be connected to a vacuum system.

As can be seen from FIGURE 1, the anode 10 and cathode halves 26–28 are preferably perforated to permit free movement of gas molecules within the tube. The machined reduced diameter portions 16 of anode 10 and portions 50 of the cathode halves (FIGURE 2) serve to assure that the various elements making up the subassembly 30 are positioned with a high degree of accuracy. This close tolerance in positioning the electrodes insures reproducibility of electric field distribution from one ion gauge to another.

The operation of the cold cathode magnetron type ionization gauge is based on substantially the same principle as other prior type gauges of this type and may be explained as follows. A high potential is applied between the cathode assembly 26–28 and the anode 10 through the metal-ceramic feedthrough elements 40 and 46. A unidirectional magnetic field H (FIGURE 2) is applied along the axis of the gauge.

Under the above conditions, a number of electrons are emitted from the cathode structure. A certain proportion of the electrons liberated move into the circular chamber 52 (FIGURE 2) where, under the influence of the radial electric and axial magnetic fields, they orbit about the anodes and drift axially, eventually being collected at the anode. Both the initial electrons and those liberated from gas molecules upon ionization contribute to the production of positive ions by collision with the gas molecules within the cylindrical chamber 52 during their spiral transit toward the anode. These positive ions move in generally curved paths and finally reach the cathode assembly 26–28 to which they give up their charges. The rate of charge transport is detected and indicated by any suitable device connected between the cathode and ground (the negative side of the high voltage supply) capable of reading very weak currents.

The ionization gauge disclosed above may be scaled up or down in size without any substantial change being made in the gauge's overall construction. The gauge can also be made demountable by using metal gasket seals should such be desired. Various other modifications and changes that can be made to adapt the gauge for other particular uses or purposes will be obvious to those skilled in the art.

It will be apparent from the foregoing that the device of this invention is more rugged in construction, and will permit higher bake-out temperatures than heretofore obtainable. It will also be seen that the metal housing will not only minimize gas permeation but will afford complete electrical shielding. The electrodes in the new tube can be accurately positioned with respect to one another, and the tube can be made up in a demountable design if desired. The tube can also conveniently be scaled up or down in size and can be easily mass produced at a low cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cold cathode magnetron type ionization gauge comprising a cylindrical housing, tubular shaped anode means, insulator ring means mounted on the edges of said anode and locating said tubular shaped anode means relative to said cylindrical housing, cathode shield means located on said insulator ring means, outer insulator ring means located between said cathode shield means and said cylindrical housing, spool shaped cathode means having flared outer portions serving to clamp said insulator ring means, said shield means, and said anode means together, thereby forming a cathode-anode assembly insulated from said cylindrical housing.

2. A cold cathode magnetron type ionization gauge according to claim 1 wherein electrical feedthrough means are connected to said anode means and said cathode means.

3. A cold cathode magnetron type ionization gauge according to claim 1 wherein both the said anode means and said cathode means are perforated.

4. A cold cathode magnetron type ionization gauge according to claim 1 wherein said spool shaped cathode means comprises two parts which are mechanically and electrically secured together.

5. A cold cathode magnetron type ionization gauge comprising, a cylindrical housing, a perforated tubular shaped anode, a first pair of ceramic rings, one of said ceramic rings being mounted between each edge of said tubular anode and said housing, a pair of metal cathode shield electrodes, a second pair of ceramic rings, one each of said electrodes being mounted between one of said first pair and one of said second pair of ceramic rings and a spool shaped cathode consisting of two substantially identical parts, one of each of said parts being mounted on said second pair of ceramic rings and clamping said anode, rings and electrodes together thereby forming a cathode-anode assembly insulated from said cylindrical housing.

6. A cold cathode magnetron type ionization gauge according to claim 5 wherein said housing is made of metal for shielding the said assembly.

7. A cold cathode magnetron type ionization gauge according to claim 6 wherein said shield ring electrodes are electrically connected to said metal housing.

8. A cold cathode magnetron type ionization gauge according to claim 7 wherein electrical feedthrough means are connected to said anode and said cathode.

9. A cold cathode magnetron type ionization gauge according to claim 8 wherein a metal tubulation is connected to said housing whereby the gauge may be connected to a system to be tested.

10. A cold cathode magnetron type ionization gauge according to claim 5 wherein said housing consists of a tubular metal cylinder closed at either end by circular metal end caps, said caps being so secured to said tubular cylinder as to form an airtight seal.

11. A cold cathode magnetron type ionization gauge according to claim 9 in which an external axial magnetic field is applied to the gauge.

12. In an ionization gauge having a generally cylindrical housing and a magnetic field passing generally axially of said housing, a sub-assembly comprising an anode in the form of a sleeve, first insulating rings at each end of said anode for holding said anode in a predetermined position within and coaxially of said housing, a spool-shaped cathode having a central portion of small diameter within said anode and enlarged end portions of large diameter adjacent the ends of said anode, second insulating rings at said enlarged end portions for holding said cathode in a predetermined position within and coaxially of said housing, said cathode being held in spaced relationship to said anode, and means for retaining said subassembly in a fixed position relative to said housing.

13. In an ionization gauge as defined in claim 12, a sub-assembly in which said retaining means comprises cathode shield members disposed between said first and said second insulating rings, said cathode shield members being attached to said housing.

14. In an ionization gauge as defined in claim 12, a sub-assembly in which said cathode comprises two pieces joined together at a point along said portion of small diameter.

References Cited by the Examiner

UNITED STATES PATENTS

| | | | |
|---|---|---|---|
| 2,431,887 | 12/1947 | Renning | 313—157 X |
| 2,448,527 | 9/1948 | Hansell | 313—157 X |

DAVID J. GALVIN, *Primary Examiner.*

GEORGE WESTBY, *Examiner.*

C. R. CAMPBELL, *Assistant Examiner.*